P. B. GILES.
AUTOMOBILE LICENSE PLATE.
APPLICATION FILED APR. 23, 1917.
1,426,856.
Patented Aug. 22, 1922.
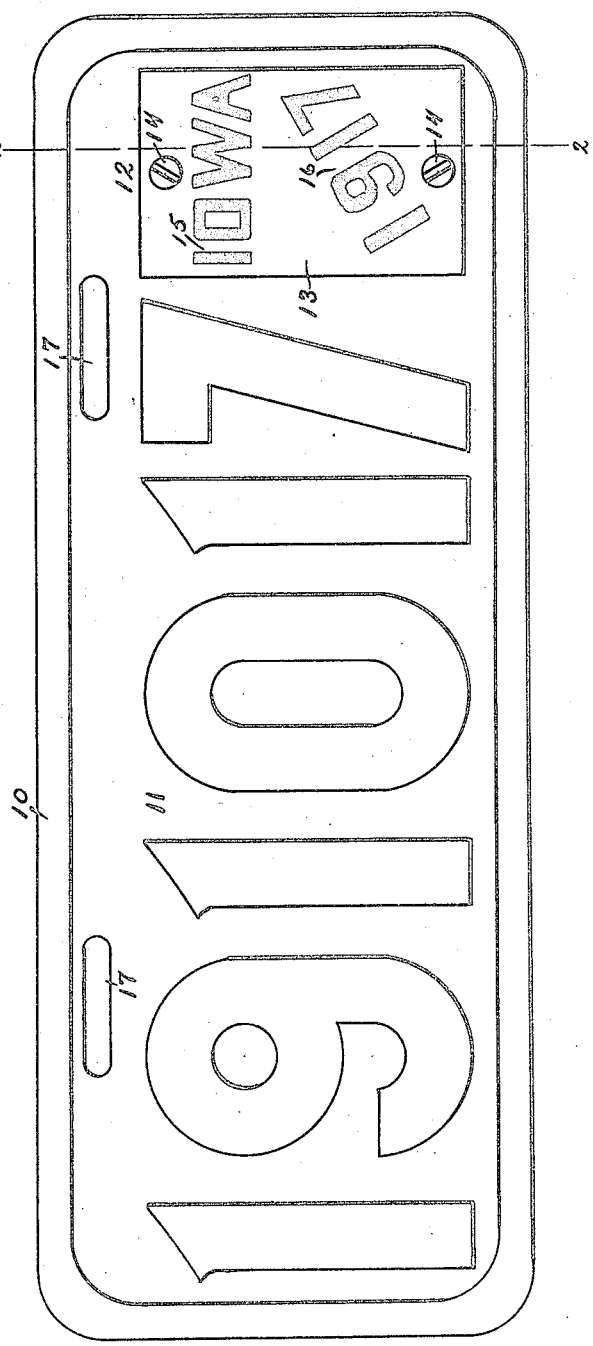
INVENTOR:
P. B. GILES

UNITED STATES PATENT OFFICE.

PLEASANT B. GILES, OF WAVERLY, IOWA, ASSIGNOR OF ONE-HALF TO JULIAN Q. LAUER, OF WAVERLY, IOWA.

AUTOMOBILE LICENSE PLATE.

1,426,856.     Specification of Letters Patent.     Patented Aug. 22, 1922.

Application filed April 23, 1917. Serial No. 163,849.

*To all whom it may concern:*

Be it known that I, PLEASANT B. GILES, citizen of the United States of America, and resident of Waverly, Bremer County, Iowa, have invented a new and useful Automobile License Plate, of which the following is a specification.

The object of this invention is to provide an improved automobile license plate with removable and replaceable index tag bearing indicia of origin, date or the like.

A further object of this invention is to provide an improved license plate of relatively permanent form which may be used with a given license number indefinitely, and adapted to be used in connection with a detachable index tag bearing the name of the state issuing the license and also a number indicating the current year for which the license has been paid.

A further object of this invention is to provide an improved construction for a license plate for motor vehicles, whereby the plate proper may be used indefinitely, thus saving the expense of annually issuing entirely new plates, yet provision is made for indicating from year to year the continuance of the license for such years, by means of a detachable year plate.

My invention consists in the construction, arrangement and combination of elements hereinafter set forth, pointed out in my claim and illustrated by the accompanying drawings, in which—

Figure 1 is a face view of my improved license number plate. Figure 2 is a cross-section on the line 2—2 of Figure 1.

In the construction of the device as shown the numeral 10 designates generally a plate, which may be formed of sheet metal of suitable thickness and enameled or finished in any desired way. The main portion of the face of the plate 10 is occupied by a license number 11 such as is commonly employed to indicate and designate a license issued by a state to the owner of a motor vehicle and generally covering a limited period of time as one year. It is customary to issue new license plates from time to time, generally with new numbers accompanied by indicia indicating the state issuing the license and sometimes also a number indicating the year for which such license is issued. This involves considerable expense in the preparation of entirely new license plates each year, or at relatively short intervals, as the plates bearing the date of a given year have no further use after such year has passed. It is my purpose to provide a plate which may be used indefinitely but which may be supplied from year to year with new index tags giving the date, at materially reduced expense.

A relatively small portion of the area of the face of the plate, preferably at one end, is left blank, as indicated by the numeral 12. The blank portion 12 of the plate is in the same plane with the body, is of a height at least as great as the license number 11, and is formed with holes adjacent the top and bottom thereof. An index tag 13 is separately formed, preferably of material corresponding to or slightly lighter than the plate 10, and finished in harmony therewith, and said index plate is of a height corresponding with the license number 11 and is formed with holes adjacent the top and bottom thereof and is adapted to be removably and replaceably mounted on the plate 10, in and over the blank space 12, as by stove bolts 14 mounted through the holes provided and registering in said plate and the tag. Thus is provision made for reinforcing and strengthening the blank portion 12 of the plate. The index tag 13 may be provided with any suitable indicia, as the name, indicated at 15, of the state issuing the license, and particularly a number 16 indicating the year for which the license fee has been paid, such date of course at any given time being the current year, or the year about to begin. The arrangement of the indicia 15, 16 on the tag 13, and relative to each other, may be varied as desired, the arrangement in the accompanying drawing being illustrative of a variety which may be employed.

The plate 10 may be provided with the usual slots 17 by which it may be attached to a bracket or other support on the vehicle to which the license number applies.

A license may be issued and a license number such as 11 assigned to a given vehicle, indicating the right to operate such vehicle during the time for which the fee is paid. At the same time an index tag such as 13 may be issued and attached to the plate 10, such tag bearing, if desired, the name of the state issuing the license and the number 16 indicating the current or ensuing year. When such period of time has expired, or is about to expire, a new tag 13 may be forwarded to the owner of the vehicle, upon payment of the provided license renewal, such tag bearing a number indicating the new period of time for which such renewal has been made. This new tag may be readily and quickly attached to the plate 10 in place of the old tag, by removal of the bolts 14 and replacing as indicated. Thus the relatively expensive plates 10 bearing the license numbers, which are expensive both as to material and process of making, inasmuch as dies needs must be changed for each new number, may be used indefinitely; while the relatively inexpensive tags 13, much smaller in size and preferably lighter in weight may be changed from year to year. Such tags are also inexpensive for the reason that one die may be employed for printing all of the tags, for a given year or limited period of time for all of the license plates to be used during such time.

I claim as my invention—

The combination with an opaque integral number plate having upon it numerals forming a permanent number and a separate space, of a detachable opaque yearly license slip, tag or plate adapted to be attached to the number plate at said space and having upon it numerals and letters, said numerals on the detachable yearly license slip, tag or plate forming the number of the year to which the license plate is immediately applicable and said letters indicating a geographical and political subdivision or area over which said license plate is usable, whereby such slip, tag or plate may be substituted by or for a similar device bearing different indicia of year or area without changing the primary number plate or the permanent number thereon.

Signed by me at Waverly, this 11th day of April, 1917.

PLEASANT B. GILES.